Sept. 16, 1930.  J. E. FORSYTH  1,776,067
TRAIN PIPE COUPLING
Filed Feb. 15, 1928

Inventor:
Joseph E. Forsyth,
By Dyrenforth, Lee, Chritton & Wiles
Attys.

Patented Sept. 16, 1930

1,776,067

UNITED STATES PATENT OFFICE

JOSEPH E. FORSYTH, OF CHICAGO, ILLINOIS, ASSIGNOR TO FORSYTH AUTOMATIC TRAIN CONNECTOR COMPANY, OF CHICAGO, ILLINOIS, A CORPORATION OF ILLINOIS

TRAIN-PIPE COUPLING

Application filed February 15, 1928. Serial No. 254,422.

This invention relates particularly to automatic train-pipe couplings; and the primary object of the invention is to provide the coupling-heads of automatic train-pipe couplings with improved gasket devices.

Automatic train-pipe couplings may be successfully employed for the purpose of automatically connecting air lines and steam line when cars are coupled. In practice, it is found necessary to equip the orifices at the faces of the coupling-heads with gaskets; and it is highly desirable to make provision for inserting new gaskets, from time to time, from the rear of the coupling-head.

The present invention relates to the provision of improved gasket devices of highly practical character.

The invention is illustrated in a preferred embodiment in the accompanying drawing, in which—

Figure 1:
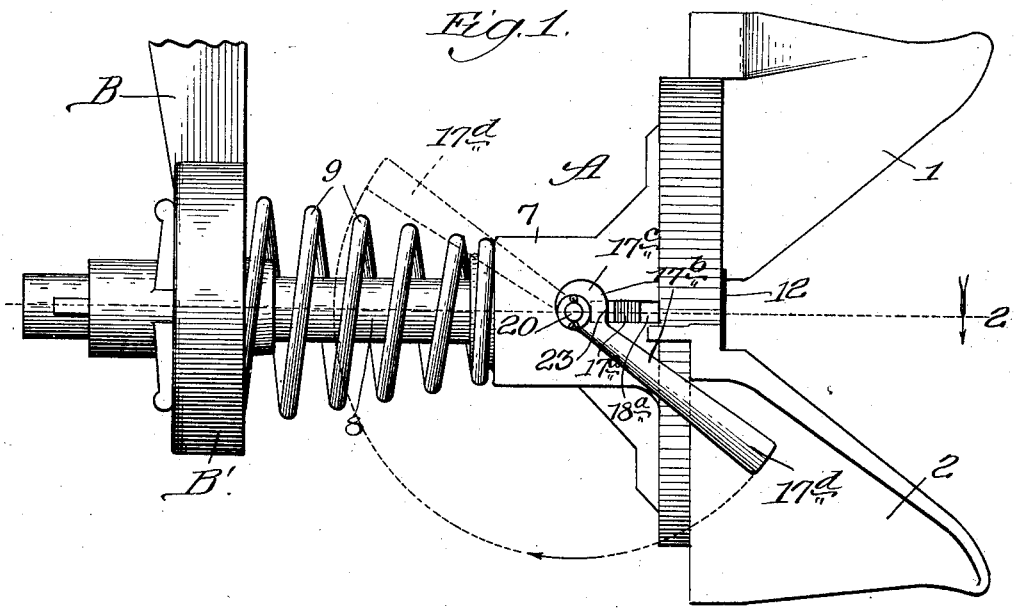
Figure 2:
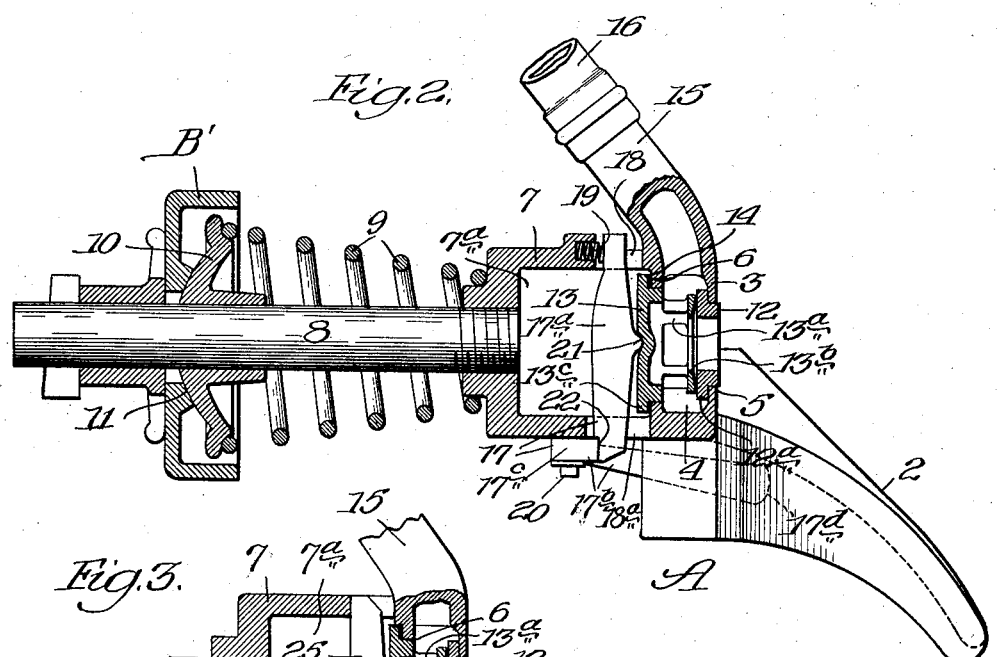

Fig. 1 is a broken side elevational view of an automatic train-pipe coupling constructed in accordance with the invention; Fig. 2, a horizontal sectional view taken as indicated at line 2 of Fig. 1; and Fig. 3, a broken view similar to Fig. 2 but showing a modification.

Referring to Figs. 1 and 2, A designates a coupling-head; and B designates a hanger on which the device is supported, usually from the draw-bar of the car.

The coupling-head is shown provided with an upper guide-prong 1 and a lower guide-prong 2, these guide-prongs being diagonally opposite each other. Also, the coupling-head is provided between the base-portions of the guide-prongs with a flat front face 3. The head is provided with a chamber 4 whose front wall has an opening 5 and whose rear wall has an opening 6, these openings being in axial alignment with each other and the rear opening being preferably larger than the front opening. The coupling-head is provided with a rearwardly extending tubular boss 7 to which is secured a stem 8 which extends freely through the ring B' of the hanger B. A conical coil-spring 9 is interposed between the member 7 and a spring-seat 10 having a universal bearing 11 in the ring B'. The tubular member 7 which preferably is formed integrally with the coupling-head A affords a chamber $7^a$.

The front wall of the chamber 4 of the coupling-head is provided at the orifice 5 with a seat which receives a rubber gasket 12, said gasket extending through the opening 5 and being provided within the chamber 4 with a retaining flange $12^a$.

Through the orifice 6 extends a plug 13 which has a spider-portion $13^a$ equipped with a ring $13^b$ which bears against the flange of the gasket 12. The plug 13 is provided with a flange $13^c$ which seats against a copper gasket 14 which is interposed between the flange and the rear wall of the chamber 4.

The coupling-head is equipped with a tubular boss, or pipe-section, 15 which communicates through a flexible hose 16 with the train-pipe (not shown). The interior of the member 15 communicates with the chamber 4 and through the spider $13^a$, the air may pass through the gasket 12.

A lever device 17 is employed for holding the plug 13 in the operative position, in which position the ring $13^b$ engages the rubber gasket 12 and the flange $13^c$ engages the copper gasket 14 so as to make an air-tight joint at that point.

The lever device 17, in the construction being described, comprises a lever 17 which extends transversely across the tubular shank 7 and a cam device $17^b$ for actuating the lever.

The tubular shank 7 is provided with lateral openings 18 and $18^a$ through which the end-portions of the lever $17^a$ extend. Back of the opening 18, the tubular shank 7 is provided with a socket in which is mounted a coil-spring 19 which engages the adjacent end of the lever $17^a$.

The cam-device $17^b$ comprises an eccentric head $17^c$ and a lever arm $17^d$ formed integrally therewith. The eccentric head $17^c$ is mounted on a stud 20 formed integrally with one of the side-walls of the tubular stem 7.

The lever $17^a$ is provided with a part-spherical boss 21 which engages a recess with which the rear wall of the plug 13 is provided centrally, forming a universal bearing at this point. One end of the lever $17^a$ is recessed as indicated at 22, the notched or recessed portion being engaged by the cam or eccentric 17ᶜ.

When the lever-arm 17ᵈ is moved from the dotted position shown in Fig. 1 to the full line position, the effect is to force the plug 13 forwardly as far as possible. That is, in this action, the plug is forced to the operative position. Inasmuch as the eccentric has a fixed throw, the spring 19 is depended upon to yield sufficiently to enable the eccentric to be thrown to the position shown in Fig. 1, where it is locked by reason of the fact that the adjacent end of the lever 17ª bears against a flat portion 23 of the eccentric.

Figure 3:
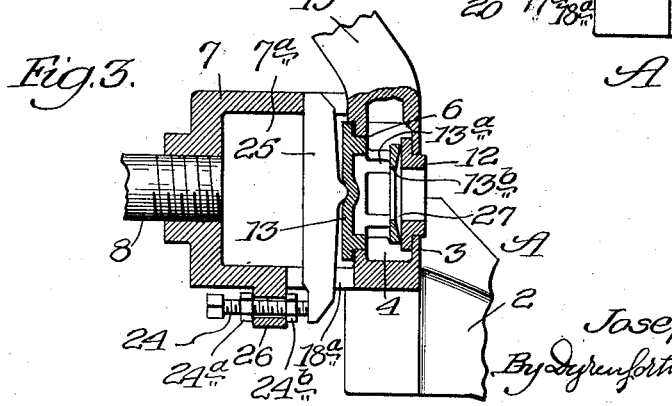

In the modification shown in Fig. 3, the construction is the same as previously described, except that the eccentric actuating device is omitted, and a set-screw 24 is employed to hold the lever 25 in position, it being observed that the lever 25 corresponds with the lever 17ª in the previously described construction.

Parts shown in Fig. 3 which correspond with parts shown in Fig. 2 are given the same reference characters. In the construction shown in Fig. 3, the use of the spring 19 is unnecessary, and so the spring is omitted. The set-screw 24 is shown passing freely through a perforation in a lug 26 which projects from one side-wall of the tubular stem 7, the set-screw being equipped with lock-nuts 24ª and 24ᵇ.

In both constructions described, it will be noted that the plug 13 has slip-joint connection with the rear wall of the chamber 4; and, inasmuch as the plug is forced directly forward by means of the lever in each construction, there is no necessary rotation of the plug with relation to the gasket 12.

The lateral opening 18ª is sufficiently large to enable the plug to be introduced into the chamber 7ª and entered into the perforation 6, after which the lever can be introduced.

It will be noted that the front face of the ring 13ᵇ is dished, or countersunk, as indicated at 27. The gasket 12 projects a short distance in front of the face 3; and when a gasket of a companion coupling-head is engaged, the gaskets are pressed rearwardly, this action being permitted by the recess 27.

The soft rubber gaskets 12 are adapted for use in connection with air-lines, such as the signal and brake lines. When a gasket is employed at the orifice through which the steam passes, it is made of suitable composition to withstand the heat.

The manner in which automatic train-pipe couplings operate is sufficiently well known in the art; hence, no detailed description is necessary in connection with the present invention.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. In a train-pipe coupling, the combination of a coupling-head provided with a chamber having openings through its front and rear walls, a gasket arranged at the front opening, a plug extending through the rear opening and serving to hold said gasket in position, and a transversely disposed lever mounted on said head back of said plug and serving to hold said plug in the operative position.

2. In a train-pipe coupling, the combination with a coupling-head having a chamber whose front and rear walls are provided with openings, said head having a rearwardly extending tubular shank, of a gasket seated at the opening in said front wall, a plug extending through the opening in said rear wall, a lever extending across said tubular shank and having one end supported by said shank, and a device adapted to adjust the other end of said lever.

3. In a device of the character set forth, a coupling-head having a chamber whose front and rear walls are provided with openings, a gasket associated with the front wall opening, a plug extending through the rear wall opening, a shank extending rearwardly from said head, a lever extending across said shank, a spring interposed between said shank and one end-portion of said lever, and a cam-device adapted to adjust the other end of said lever.

4. In a device of the character set forth, a coupling-head having a chamber with a pipe leading thereto and having a tubular shank extending rearwardly and affording a chamber, the front and rear walls of said first-mentioned chamber being provided with perforations and said second-mentioned chamber being provided with a lateral opening through which a plug may be introduced, a gasket associated with the front wall opening, a plug extending through the rear wall opening, said plug having a forwardly extending spider and ring adapted to hold said gasket in position, a lever extending through said lateral opening for holding the plug, and means coacting with said lever to wedge the plug in operative position.

5. In a device of the character set forth, a coupling-head having a chamber whose front and rear walls are provided with openings, said coupling-head having a tubular shank extending rearwardly therefrom, a gasket associated with the front wall opening, a plug extending through the rear wall opening, a lever extending through a lateral opening in said shank, a spring-bearing for one end of said lever, a stud projecting laterally from said tubular shank, and a lever-equipped eccentric mounted on said stud and engaging the adjacent end of said lever.

6. A device of the character set forth, comprising a coupling-head provided with a chamber having its front and rear walls provided with openings, a gasket projecting through the front opening and having a flange disposed back of the front wall, a plug extending through the rear opening and engaging said gasket and having a flange disposed back of the rear wall, and a lever device engaging said plug and equipped with adjusting means.

7. A structure as specified in claim 2, in which the first-mentioned end of the lever bears against a spring with which the tubular shank is equipped.

JOSEPH E. FORSYTH.